(12) United States Patent
Tupper

(10) Patent No.: US 6,957,603 B1
(45) Date of Patent: Oct. 25, 2005

(54) MODULATED OVERPRESSURE VALVE STRUCTURE FOR FLUID OPERATED DEVICE

(75) Inventor: Myron D. Tupper, Boring, OR (US)

(73) Assignee: Latch-Tool Development Co. LLC, Colorado Springs, CO (US)

( * ) Notice: Subject to any disclaimer, the term of this patent is extended or adjusted under 35 U.S.C. 154(b) by 0 days.

(21) Appl. No.: 10/997,912

(22) Filed: Nov. 29, 2004

Related U.S. Application Data

(60) Provisional application No. 60/625,132, filed on Nov. 5, 2004.

(51) Int. Cl.[7] ............................................. F15B 15/20
(52) U.S. Cl. ......................................... 91/392; 91/401
(58) Field of Search .......................... 91/355, 392, 400, 91/401, 410; 137/529

(56) References Cited

U.S. PATENT DOCUMENTS

| | | | | |
|---|---|---|---|---|
| 4,241,644 A | * | 12/1980 | Schertler | ...................... 91/400 |
| 6,035,634 A | * | 3/2000 | Tupper et al. | ................. 60/477 |
| 6,341,621 B1 | * | 1/2002 | Tupper et al. | ............... 137/529 |
| 6,581,630 B1 | * | 6/2003 | Kaneko | ....................... 137/529 |
| 6,837,266 B2 | * | 1/2005 | Fredrickson et al. | ........ 137/529 |

* cited by examiner

Primary Examiner—Thomas E. Lazo
(74) Attorney, Agent, or Firm—Manelli Denison & Selter; Edward J. Stemberger

(57) ABSTRACT

A pressure releasing valve structure 36" is provided for a fluid operated device 10. The device has an orifice 42 constructed and arranged to be in fluid communication with a pressure chamber C. The valve structure includes a body 49 having first and second ends. A valve member 40 is provided at the first end of the body and is constructed and arranged to seal the orifice 42. A first spring 38 is associated with the first end of the body and is constructed and arranged to cause the valve member 40 to seal the orifice 42 under first pressure conditions in the pressure chamber C. A second spring 50 is associated with the second end of the body and is constructed and arranged to compress thereby reducing a force exerted by the first spring 38, permitting the valve member 40 to move to a non-sealing position to open the orifice under pressure conditions in the pressure chamber C lower than would be required absent the provision of the second spring.

21 Claims, 3 Drawing Sheets

MODULATED OVERPRESSURE VALVE STRUCTURE FOR FLUID OPERATED DEVICE

This application is based on U.S. Provisional Application No. 60/625,132, filed on Nov. 5, 2004, and claims the benefit thereof for priority purposes.

FIELD OF THE INVENTION

The invention relates to fluid operated devices such as hand tools or other actuated equipment and, more particularly, to a valve structure enabling a modulation feature of the tool or equipment.

BACKGROUND OF THE INVENTION

In U.S. Pat. No. 6,341,621, a fluid operated device or tool 10 is shown, which includes a valve structure 36 that functions as a combined over-pressure relief and pressure release mechanism. FIG. 1 shows the conventional valve structure 36' similar to that of the above-mentioned patent. In the normal course of operation, fluid pressure in the tool 10 continues to increase by action of a pump piston 20 that imparts increased force on a ram piston 28. When pressure in a drive chamber C reaches a pre-determined pressure as regulated by spring 38, ball valve 40 disengages from its seat, thus permitting fluid flow through opening 42. Fluid moves into a bulkhead chamber 43 until the pressure in the drive chamber C returns to the pre-determined maximum pressure. Fluid entering chamber 43 is distributed to a piston reservoir chamber E through conduit 44 and into chamber A via a conduit (not shown). This overpressure relief mechanism prevents the tool 10 from becoming too aggressive for its work and provides the user a cautionary measure of safety.

Once the tool 10 has performed its work, valve structure 36' becomes the mechanism for releasing and resetting the tool 10. Over-travel of the pump piston 20 away from the bulkhead 12 beyond its normal pumping range will cause the valve structure 36' to travel to the right in FIG. 1. Travel of the valve structure 36' can be controlled via adjustment nut 54. Travel of the valve structure 36' unseats ball valve 40 permitting fluid in drive chamber C to communicate with accumulator chamber A through a conduit (not shown), and through barrier valve 60 to communicate with ram reservoir chamber B, and through conduit 44 to communicate with the piston reservoir chamber E that communicates with pumping chamber D. While in this mode, ram 28 may be retracted into the tool 10 by hand or some other external force. Once the tool 10 has been reset, the pump piston is released from its over-traveled position and spring 38 will reseat valve 40.

Although the valve structure 36' works well for its intended purpose, the valve structure can be improved to modulate the pressure in the drive chamber C.

Thus, there is a need to provide a valve structure in a fluid operated device to provide modulation of the device.

SUMMARY OF THE INVENTION

An object of the invention is to fulfill the need referred to above. In accordance with the principles of the present invention, this objective is achieved by providing a pressure releasing valve structure for a fluid operated device. The device has an orifice constructed and arranged to be in fluid communication with a pressure chamber. The valve structure includes a body having first and second ends. A valve member is provided at the first end of the body and is constructed and arranged to seal the orifice. A first spring is associated with the first end of the body and is constructed and arranged to cause the valve member to seal the orifice under certain pressure conditions in the pressure chamber. A second spring is associated with the second end of the body and is constructed and arranged to compress thereby reducing a force exerted by the first spring, permitting the valve member to move to a non-sealing position to open the orifice under pressure conditions in the pressure chamber lower than would be required absent the provision of the second spring.

In accordance with another aspect of the invention, a fluid operated device is provided and includes surfaces defining a pressure chamber constructed and arranged to contain fluid. Surfaces also define an orifice in fluid communication with the pressure chamber. The device includes a valve structure having a body with first and second ends. A valve member is provided at the first end of the body and is constructed and arranged to seal the orifice. A first spring is associated with the first end of the body and is constructed and arranged to cause the valve member to seal the orifice under certain pressure conditions in the pressure chamber. A second spring is associated with the second end of the body and is constructed and arranged to compress thereby reducing a force exerted by the first spring, permitting the valve member to move to a non-sealing position to open the orifice under pressure conditions in the pressure chamber lower than would be required absent the provision of the second spring.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
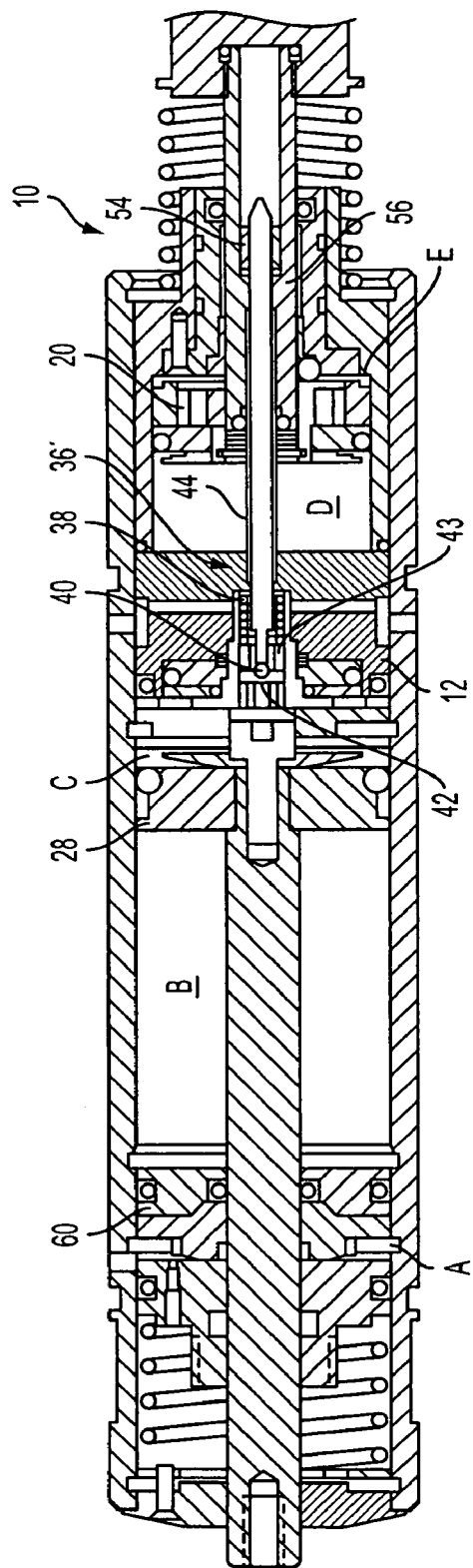
FIG. 1 is a cross-sectional view of a tool having a conventional valve structure for overpressure conditions.
Figure 2:
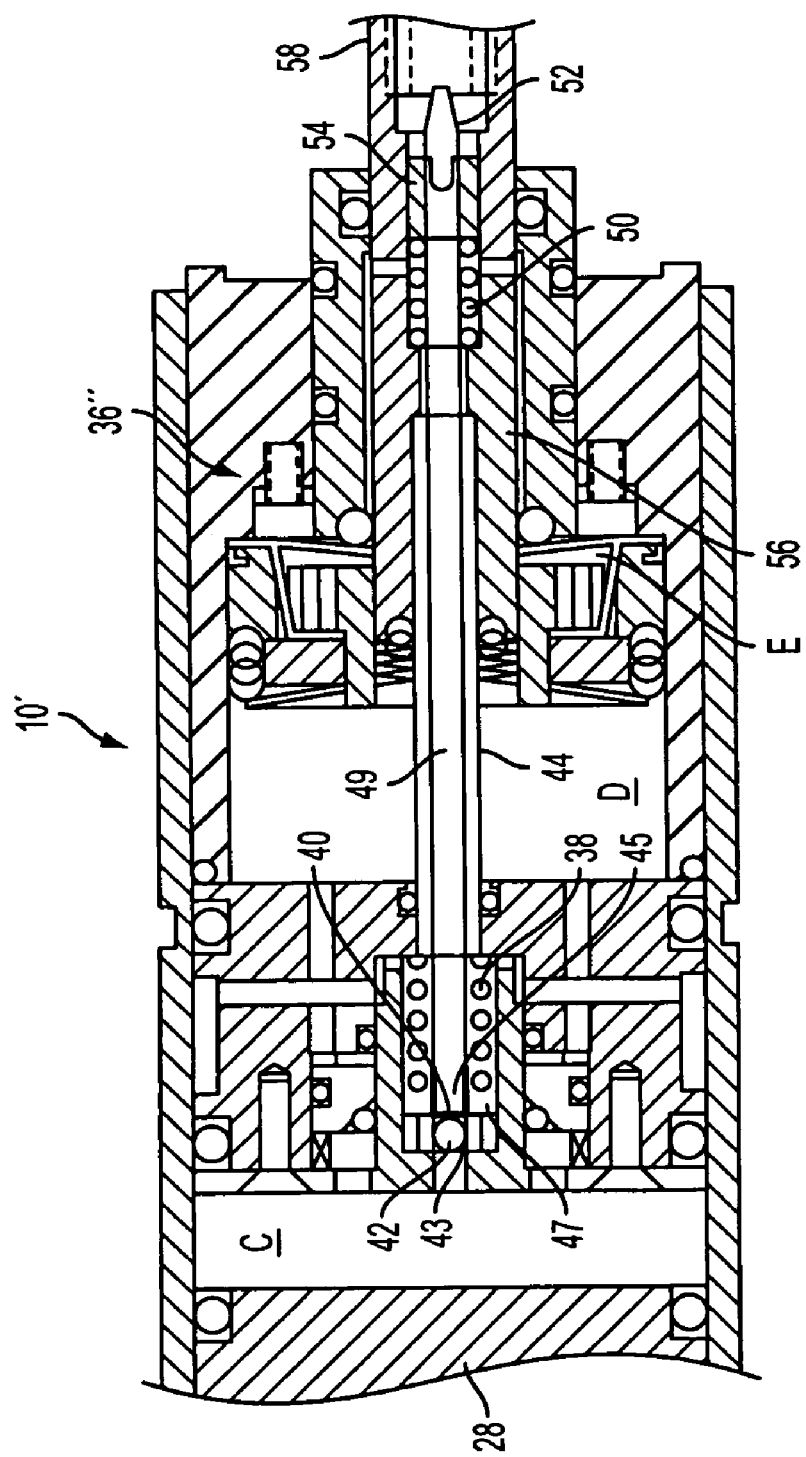
FIG. 2 is a cross-sectional view of an overpressure valve structure provided in accordance with the principles of the present invention.

With reference to FIG. 2, an overpressure valve structure, generally indicated at 36" in tool 10', is shown in accordance with the principles of the invention. The tool 10' and valve structure 36" is substantially identical to tool 10 and valve structure 36' of FIG. 1 (thus, like parts are given like numbers) except that, in accordance with the invention, a compression spring 50 is provided at end 52 of the valve structure 36". More particularly, near end 52 of body 49, spring 50 is provided between an end surface of the adjusting nut 54 and a seating surface of the housing 56 of the valve structure 36".

As in the tool 10 of FIG. 1, in the tool 10' of FIG. 2, end 45 of the body 49 is threaded through a nut 47 that compresses spring 38 and forces the ball valve 40 to close the orifice or opening 42 under first pressure condition in the drive chamber C. The valve structure 36" can be substituted for the valve structure 36' in the tool 10 of FIG. 1 and functions the same as discussed above, and as described in U.S. Pat. No. 6,341,621, with regard to overpressure and resetting of the tool 10. The entire description and function of the tool 10 is described in U.S. Pat. No. 6,341,621, the content of which is hereby incorporated into the present specification by reference.

In the embodiment of FIG. 2, however, when the spring 50 is compressed due to travel of housing 56 to the right in FIG. 2, the force exerted by spring 38 is reduced. Thus, any increase in the compression of the spring 50 will reduce the force on the ball valve 40. When the force on spring 50 is increased to the point of spring 50 being substantially fully compressed or bottomed-out thereby reducing the force of spring 38 to about zero, the ball valve 40 of FIG. 2 will move to a position to unblock orifice 42 due to the pressure in chamber C.

Figure 3:
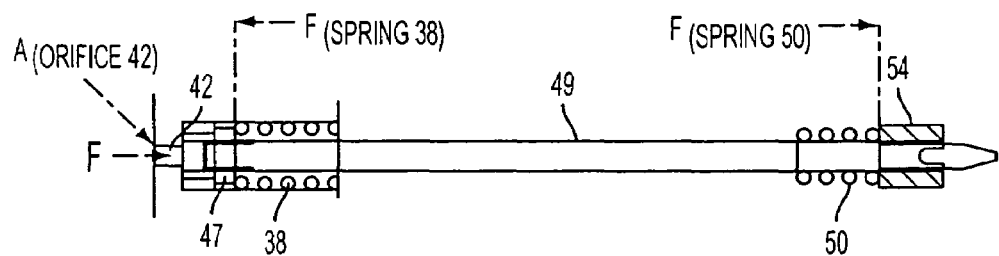
FIG. 3 shows force relationships of springs of the valve structure of FIG. 2.

FIG. 3 shows the force relationship of springs 38 and 50. Thus:

$$A_{orifice\ 42} * PSI_{chamber\ C} = (F_{spring\ 38} - F_{spring\ 50}) = F$$

or $$PSI_{chamber\ C} = \frac{(F_{spring\ 38} - F_{spring\ 50})}{A_{orifice\ 42}}$$

Thus, it can be seen that the additional spring 50 exerts a force in a direction opposite of the force exerted by spring 38. Thus, by employing spring 50, the ball valve 40 will unblock (open) orifice 42 at a pressure lower than that required to move the ball valve in the embodiment of FIG. 1 (wherein no spring 50 is employed). Furthermore, by selecting the spring rate of springs 38 and 50, the operating pressure in chamber C can be advantageously selected.

It is contemplated to employ a conventional ball screw coupled with rod 58 (FIG. 1). The ball screw (not shown) can be driven by a stepper motor to provide incremental increase in compression of the spring 50 and thus incremental reduction of the force exerted by spring 38. Once the spring 50 is fully compressed or bottoms-out, the ball valve 40 moves to open the orifice 42.

It can be appreciated that the valve 40 need not be limited to ball valve, but the valve 40 can be conical or other shapes that are constructed and arranged to seal an opening.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A pressure releasing valve structure for a fluid operated device, the device having an orifice constructed and arranged to be in fluid communication with a pressure chamber, the valve structure comprising:
   a body having first and second ends,
   a valve member at the first end of the body constructed and arranged to seal the orifice,
   a first spring associated with the first end of the body and constructed and arranged to cause the valve member to seal the orifice under certain pressure conditions in the pressure chamber, and
   a second spring associated with the second end of the body and constructed and arranged to compress thereby reducing a force exerted by the first spring, permitting the valve member to move to a non-sealing position to open the orifice under pressure conditions in the pressure chamber lower than would be required absent the provision of the second spring.

2. The valve structure of claim 1, wherein the body is disposed in a conduit such that under certain conditions, an amount of fluid may enter the conduit and be directed to a portion of the device.

3. The valve structure of claim 1, wherein the valve member is a ball valve.

4. The valve member of claim 1, further comprising a nut, the first end of the body being constructed and arranged to be threaded into the nut thereby compressing the first spring and thus biasing the valve structure such that the valve member seals the orifice under the certain pressure conditions.

5. The valve member of claim 1, further comprising an adjustment nut near the second end of the body constructed and arranged to adjust travel of the valve structure.

6. The valve structure of claim 5, further comprising a housing, wherein the second spring is provided between a surface of the adjustment nut and a seating surface defined in the housing, the housing being constructed and arranged to move thereby compressing the second spring.

7. The valve structure of claim 1, wherein the second spring is constructed and arranged such that when the second spring is substantially fully compressed, the valve member moves to the non-sealing position.

8. The device of claim 1, wherein the second spring is constructed and arranged such that when the second spring is substantially fully compressed, the valve member moves to the non-sealing position.

9. A pressure releasing valve structure for a fluid operated device, the device having an orifice constructed and arranged to be in fluid communication with a pressure chamber, the valve structure comprising:
   a body having first and second ends,
   first means, at the first end of the body, for sealing the orifice,
   second means, associated with the first end of the body, for causing the first means to seal the orifice under certain pressure conditions in the pressure chamber, and
   third means, associated with the second end of the body, for reducing a force exerted by the second means, thereby permitting the first means to move to a non-sealing position to open the orifice under pressure conditions in the pressure chamber lower than would be require absent the provision of the third means.

10. The valve structure of claim 9, wherein the body is disposed in a conduit such that under certain conditions, an amount of fluid may enter the conduit and be directed to a portion of the device.

11. The valve structure of claim 9, wherein the first means is a ball valve.

12. The valve member of claim 9, further comprising a nut and wherein the second means is a first spring, the first end of the body being constructed and arranged to be threaded into the nut thereby compressing the first spring and thus causing first means to seal the orifice under the certain pressure conditions.

13. The valve member of claim 9, further comprising an adjustment nut near the second end of the body constructed and arranged to adjust travel of the valve structure.

14. The valve structure of claim 13, further comprising a housing and wherein the third means is a second spring provided between a surface of the adjustment nut and a seating surface defined in the housing.

15. The valve structure of claim 9, wherein the second spring is constructed and arranged such that when the second spring is substantially fully compressed, the first means moves to the non-sealing position.

16. A fluid operated device comprising:
   surfaces defining a pressure chamber constructed and arranged to contain fluid,
   surfaces defining an orifice in fluid communication with the pressure chamber, and
   a valve structure comprising:
      a body having first and second ends,
      a valve member at the first end of the body constructed and arranged to seal the orifice,
      a first spring associated with the first end of the body and constructed and arranged to cause the valve member to seal the orifice under certain pressure conditions in the pressure chamber, and
      a second spring associated with the second end of the body and constructed and arranged to compress thereby reducing a force exerted by the first spring.

17. The device of claim 16, wherein the body is disposed in a conduit such that under certain conditions, an amount of fluid may enter the conduit and be directed to a portion of the device.

18. The device of claim 16, wherein the valve member is a ball valve.

19. The device of claim 16, further comprising a nut, the first end of the body being constructed and arranged to be threaded into the nut thereby compressing the first spring and thus biasing the valve structure such that the valve member seals the orifice under the first pressure conditions.

20. The device of claim 16, further comprising an adjustment nut near the second end of the body constructed and arranged to adjust travel of the valve structure.

21. The device of claim 20, further comprising a housing, wherein the second spring is provided between a surface of the adjustment nut and a seating surface defined in the housing, the housing being constructed and arranged to move thereby compressing the second spring.

* * * * *